United States Patent [19]

Gordon

[11] 4,165,444
[45] Aug. 21, 1979

[54] APPARATUS FOR ELECTRONIC ENCYPHERMENT OF DIGITAL DATA

[75] Inventor: John A. Gordon, Hatfield, England

[73] Assignee: National Research Development Corporation, London, England

[21] Appl. No.: 855,685

[22] Filed: Nov. 29, 1977

[30] Foreign Application Priority Data

Dec. 11, 1976 [GB] United Kingdom ............... 51823/76

[51] Int. Cl.² .............................................. H04L 9/00
[52] U.S. Cl. ............................. 178/22; 340/146.1 AL
[58] Field of Search .................. 178/22; 340/146.1 AL

[56] References Cited

U.S. PATENT DOCUMENTS

| | | | |
|---|---|---|---|
| 3,629,824 | 12/1971 | Bossen | 340/146.1 AL |
| 3,740,475 | 6/1973 | Ehrat | 178/22 |
| 3,958,081 | 5/1976 | Ehrsam et al. | 178/22 |
| 3,962,539 | 6/1976 | Ehrsam et al. | 178/22 |
| 3,988,538 | 10/1976 | Patten | 178/22 |

OTHER PUBLICATIONS

D. J. Sykes, *Datamation*, Aug. 1976, pp. 81–85, 178–22.
H. Feistel, "Scientific American", May 1973, vol. 228, No. 5, pp. 15–23, 178–22.
Proposed Federal Information Processing Data Encryption Standard, Federal Register of 1 Aug. 1975, 178–22.
D. J. Torrieri, Word Error Rates in Cryptographic Ensembles, Naval Research Lab Report 7616.

*Primary Examiner*—S. C. Buczinski
*Attorney, Agent, or Firm*—Oblon, Fisher, Spivak, McClelland & Maier

[57] ABSTRACT

Apparatus and methods are described for finding the coefficients of minimum polynominals in a Galois field $GF(2^m)$. Such coefficients are useful in selecting tap connections for a shift register, the taps usually being connected to an EX-OR gate in a feedback connection to the input shift register stage. Where $2^m - 1$ is prime, with the selected tap connections the shift register generates a maximal length sequence which can be used for encyphering or decyphering. Several forms of apparatus for such processes are also described.

14 Claims, 5 Drawing Figures

APPARATUS FOR ELECTRONIC ENCYPHERMENT OF DIGITAL DATA

The present invention relates to an apparatus for encyphering and decyphering data and employs an apparatus for finding the coefficients of minimum polynomials in a Galois field.

Secrecy in digital data transmitted from place to place, for example between computers, is important in order to prevent unauthorised persons from obtaining the data and, perhaps, altering it. Since much of such traffic is transmitted along telephone channels (line and radio) it is liable to interception. Thus encyphering is likely to be more effective in keeping data secret than preventing access to the channels.

The digits of a cypher are different from those of the data they represent, but related to them in a complicated way such that it is extremely difficult to work out the data without the special information called the key. The key, in the case considered here, consists of a m-bit binary number, or m-tuple where the latter means just an ordered set of m (in this case binary) digits. The key is used to set apparatus for encyphering and decyphering such that the latter will recover the data which the former has encyphered. Attempted use of the incorrect key in the decyphering apparatus will not recover the data, so that the intended recipient must be informed of it in advance. The essence of the cypher is that lack of the key is an effective barrier to recovering the data. Also if the key is accidently released to a third party, it is only necessary for the sender and intended recipient to change the key to enable secure communication to be resumed.

A knowledge of the theory of Galois fields is required in order to understand the invention. Such fields are briefly discussed below but more detailed descriptions of this theory will be found in:

The book "Error correcting codes" by W. W. Peterson and E. J. Weldon, Jr., published by M.I.T. (1971) and the book "Algebraic coding theory" by E. R. Berlekamp, published by McGraw Hill (1968).

A Galois field consists of a group of m-tuples and rules for multiplying and adding them together. These rules differ from the normal rules of arithmetic in most respects, and it is important to realise this in what follows. One important difference is that when two m-tuples are added or multiplied together according to these rules, the result is also an m-tuple. Addition of the m-tuples is by modulo-two addition without carry and multiplication is a process of summing selected "partial products" obtained by shifting the multiplicand and partial products, and forming the partial products partly from digits which would otherwise increase the number of digits in the m-tuple. Selection of partial products for summing is according to the digits of the multiplier.

According to a first aspect of the invention, there is provided an encyphering or decyphering apparatus comprising a shift register having m stages where m is a positive integer and $2^m - 1$ is prime, each stage having an associated respective tap connection where an output signal representative of the conduction state of that stage is, in operation, available; first logic means, having a plurality of input terminals, for combining input signals applied to the terminals according to a first predetermined logical process; selection means for automatically selecting tap connections and coupling the selected connections to respective inputs of the first logic means, the tap connections being so selected in accordance with the coefficients of minimum polynomials in a Galois-field $GF(2^m)$ that the position of the stage associated with each selected tap connection in the shift register corresponds to the position of a predetermined value of coefficient in one of the minimum polynomials, and second logic means for combining digital signals which are to be encyphered or decyphered with other digital signals according to a second predetermined logical process, which may be the same as the first logical process, the other digital signals being related to the output signals of the first logic means, the selection means in operation finding the said coefficients, starting from any arbitrary element b in the field which satisfies k=m where k is the least integer with the property $b^{2^k} = b$, and the selection means comprising squaring means for providing first digital signals representing a first sequence of m-tuples, the first m-tuple in the first sequence representing the element b in $GF(2^m)$ except 0 or 1 and each successive m-tuple in the first sequence representing the square of the element represented by the preceding m-tuple up to the power $2^{m-1}$, means for deriving second digital signals from the first digital signals, the second digital signals representing a second sequence of m-tuples in which each m-tuple equals the modulo-two addition of one m-tuple of the first sequence and a further m-tuple representing the coefficients of a primitive element in $GF(2^m)$ which is a root of a primitive polynomial of degree m, means for deriving a third digital signal from the second digital signals, the third digital signal representing the Galois-field product of all the m-tuples of the second sequence multiplied together, and means for deriving a fourth digital signal from the third digital signal, the fourth digital signal representing the modulo-two sum of m-tuples representing the said product and the said primitive polynomial as represented by its coefficients.

According to a second aspect of the present invention there is provided an encyphering or decyphering apparatus comprising a shift register having m stages where m is a positive integer and $2^m - 1$ is prime, each stage having an associated respective tap connection where an output signal representative of the conduction state of that stage is, in operation, available, first logic means, having a plurality of input terminals, for combining input signals applied to the terminals according to a first predetermined logical process, selection means for automatically selecting tap connections and coupling the selected connections to respective inputs of the first logic means, the tap connections being so selected in accordance with the coefficients of minimum polynomials in a Galois-field $GF(2^m)$ that the position of the stage associated with each selected tap connection in the shift register corresponds to the position of a predetermined value of coefficient in one of the said polynomials, and second logic means for combining digital signals which are to be encyphered or decyphered with other digital signals according to a second predetermined logical process, which may be the same as the first logical process, the said other digital signals being related to the output signals of the first logic means, the selection means in operation finding the said coefficients, starting from any arbitrary element b in the said field which satisfies k=m where k is the least integer with the property $b^{2^k} = b$, and the selection means being constructed to form the Galois-field product $$T=(b+w)(b^2+w)(b^4+w)(b^8+w)\ldots(b^{2^{m-1}}+w)$$

where b is any arbitrary element in $GF(2^m)$ except 0 or 1, and w is a root of a primitive polynomial of degree m, and to form the modulo-two sum of T as represented by the coefficients thereof and the said primitive polynomial as represented by its coefficients.

Cypher keys may include a chosen arbitrary element from which the first sequence of m-tuples is formed and the coefficients found by the apparatus are then used, to form a sequence of digits which may be added, bit by bit, by modulo two addition without carry, to data to be encyphered and then added again (by the same process which is also equivalent to subtraction) to recover the data. In order to obtain the maximum possible sequence length, coefficients found by the apparatus according to the invention, that is coefficients of a primitive polynomial in a Galois field $GF(2^m)$ where $2^m-1$ is prime, must be used. Shorter sequences would not be used since the encyphered data then derived would be easier to decode without knowing the key.

A maximal length sequence of m-tuples may be obtained from a shift register and an exclusive-or (EX-OR) gate if the most significant stage of the shift register and a pattern of other stages defined by coefficients found by apparatus according to the invention when $2^m-1$ is prime are connected as inputs to the EX-OR gate and the output of the gate is connected to the input of the shift register. The EX-OR gate carries out the process of modulo two addition.

Encyphering may thus be carried out by adding digital data bit by bit to the sequence generated in the shift register. Decyphering apparatus then comprises a further shift register and EX-OR gate to generate the maximal length sequence which is added to the encyphered data to restore the data to its original form. In this later process the sequence used in decyphering must start at a certain digit so that any particular encyphered digit has the same digit added to it during decyphering as was added to form the digit during encyphering. The starting digit is specified as part of the key and another part of the key specifies the said arbitrary element applied to the squaring means of apparatus according to the invention.

Other, more complex, examples of encyphering and corresponding decyphering apparatus are described below.

Apparatus according to the invention may be in hardware form, that is as interconnected circuits or may be in the form of a programmed computer. The various means mentioned are not necessarily distinct from one another since, for example part of one means may be used as part of another, or one means may be controlled to perform two or more processes.

Certain embodiments of the invention will now be described with reference to the accompanying drawings in which.

Apparatus for generating a sequence is first described and then a method of determining how to set the apparatus to provide maximal length sequence is given. Further apparatus based on the method is then described.

Figure 1:
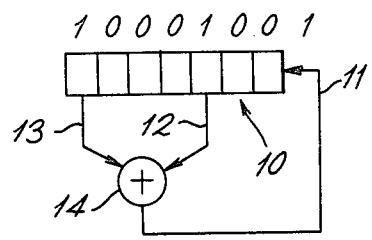
FIG. 1 is a block diagram of apparatus for generating a sequence of binary digits.

The relationship between a polynomial and the connections to a shift register is well described in the above mentioned books. This relationship is also illustrated in FIG. 1, where a shift register 10 has seven stages with taps 11, 12 and 13 at the first stage, the third stage and the seventh stage (from right to left), respectively. A modulo-2 gate 14 (that is an EX-OR gate) is connected with the taps 12 and 13 as inputs and the tap 11 as output. The coefficients of an (m+1)-tuple are also shown above the register. The polynomial is presented as a (m+1)-tuple, (since in the case considered ($2^m-1$ prime) it turns out that the minimum polynomials all have degree m and hence have m+1 coefficients, each being 0 or 1, and these coefficients, ordered such that the coefficient of $x^m$ is on the left and the rest in descending degree form a (m+1)-tuple). For example with m=7, such a polynomial is $x^7+x^3+1$ and this has a 8-tuple representation 10001001. Thus the shift register of FIG. 1 has feedback connections or taps corresponding in position with the "ones" in the polynomial coefficients shown in the figure. A tap is present if there is a "one" in the corresponding position in the (m+1)-tuple but absent otherwise.

In order to obtain a maximal length sequence it is important to select the tap connections correctly. Where m is not small there are many groups of tap connections which lead to different maximal length sequences.

If m is an integer such that $2^m-1$ is a prime number, e.g. among others the values 3, 7, 13, 17, 19, 31 are suitable m's, then all non-zero elements (except 0 and 1) in $GF(2^m)$ are primitive and their minimum polynomials may be used (as described in the above mentioned books) to generate maximal-length shift register sequences (m-sequences), by making the tap connections correspond to the coefficients of the minimum polynomials. These sequences have periodicity of $2^m-1$.

It is known, for example from the above mentioned books, that if "a" is a primitive element in $GF(2^m)$, then any non-zero element in $GF(2^m)$ may be represented as (1) "a," raised to a power in the range 0 to $2^m-2$.

(2) a polynomial of degree m−1 or less, in "a," with binary coefficients, being the remainder polynomial when a type (1) representation is divided by $M_a(x)$, the primitive polynomial of degree m with binary coefficients of which "a" is a root, or as (3) an m-tuple or m-bit binary word, being just the coefficients of the type (2) representation.

For example Table 1 shows the non-zero elements of $GF(2^4)$ in all three forms, the primitive polynomial in this example being $M_a(x)=x^4+x+1$.

TABLE 1

| Representation of the non-zero elements of GF ($2^4$) | | |
|---|---|---|
| (1) as a power of a | (2) as a polynomial in a, of deg. 3 or less | (3) as a 4-tuple |
| $a^0$ | 1 | 0001 |
| $a^1$ | a | 0010 |
| $a^2$ | $a^2$ | 0100 |
| $a^3$ | $a^3$ | 1000 |
| $a^4$ | a + 1 | 0011 |
| $a^5$ | $a^2$ + 1 | 0110 |
| $a^6$ | $a^3 + a^2$ | 1100 |
| $a^7$ | $a^3$ + a + 1 | 1011 |
| $a^8$ | $a^2$ + 1 | 1010 |
| $a^9$ | $a^3$ + a | 1010 |
| $a^{10}$ | $a^2$ + a + 1 | 0111 |
| $a^{11}$ | $a^3 + a^2 + a$ | 1110 |

TABLE 1-continued

| Representation of the non-zero elements of GF ($2^4$) | | |
|---|---|---|
| (1) as a power of a | (2) as a polynomial in a, of deg. 3 or less | (3) as a 4-tuple |
| $a^{12}$ | $a^3 + a^2 + a + 1$ | 1111 |
| $a^{13}$ | $a^3 + a^2 + 1$ | 1101 |
| $a^{14}$ | $a^3 + 1$ | 1001 |
| $a^{15}$ | 1 | 0001 |
| etc | etc. | etc. |

It will be seen that after $a^{14}$ the type (2) and type (3) representations repeat cyclically.

The minimum polynomial, $M_b(x)$ of an arbitrary non-zero element "b" of GF($2^m$) is that unique polynomial with binary coefficients with least degree, of which "b" is a root. The coefficients of such polynomials are those required for obtaining a maximal length sequence.

The polynomial $M_b(x)$ has as roots all the k distinct elements of the form $b, b^2, b^4, b^8 \ldots, b^{2k-1}$ where k is the least integer with the property $b^{2k}=b$. Thus $M_b(x)$ has degree k and may be factored thus:

$$M_b(x) = (x+b)(x+b^2)(x+b^4) \ldots (x+b^{2k-1}) \quad \text{Eq. (1)}$$

and it is required to find the polynomial in the form $$M_b(x) = B_k x^k + B_{k-1} x^{k-1} + \ldots + B_O \quad \text{Eq. (2)}$$

with $B_i = 0$ or 1.

One straightforward method to obtain equation (2) from equation (1) is to multiply out all the linear polynomials. At each stage of this process it is necessary to deal with a polynomial of degree up to k with coefficients over GF($2^m$). However at the final stage, as the last linear factor is multiplied out all these coefficients become binary, since the polynomial $M_b(x)$ has binary coefficients. Other techniques to obtain equation (2) use matrices but are of comparable burden.

The present invention depends on the realization that if "w" is a primitive element in GF($2^m$), i.e. "w" is a root of the primitive polynomial $P_w(x)$, a degree m polynomial, then the element $$T = (b+w)(b^2+w)(b^4+w)(b^8+w) \ldots (b^{2k-1}+w)$$

has the property that if T and $P_w$ are written as m-tuple and (m+1)-tuple respectively, then the m+1-tuple corresponding to the minimum polynomial of "b" is either T when k<m or T+$P_w$ when K=m and these correspond to cases 1 and 2 below.

This method of finding the minimum polynomial depends itself on the realization that it is not essential to preserve the k+1 coefficients in deriving equation 2 as m-tuples throughout the multiplying-out of the linear factors, or in other words the polynomial $M_b(x)$ can be represented as a k+1-tuple. The two possible cases k=m and k<m are now illustrated. Only the second case is applicable to encyphering and decyphering since k always equals m when $2^m-1$ is prime.

Case 1, k<m

The required k+1 coefficients $B_k, B_{k-1}, \ldots, B_O$ may be associated with the element $B_k a^k + B_{k-1} a^{k-1} + \ldots B_O$ of GF($2^m$) which is a type (2) representation, which has a corresponding type (3) representation $B_k B_{k-1} \ldots B_O$. Furthermore $$M_b(a) = (a+b)(a+b^2)(a+b^4)(a+b^{2k-1}) \quad (3)$$

which is a non-zero element of GF($2^m$), (i.e. not a polynomial in x with m-tuple coefficients) has a type 2 representation of the form $$M_b(a) = B'_{m-1} a^{m-1} + B'_{m-2} a^{m-2} + \ldots + B'_O \quad (4)$$

with $B'_i = 0$ or 1. Now since k<m and since the type (2) representation of elements is unique we must have $$B'_i = B_i, \quad 0 \leq i \leq k \quad (5)$$

Now to evaluate (3) is just to evaluate $M_b(x)$ for a particular value, b, of x, while to evaluate (1) requires manipulation of k+1 times as many terms. (The difference in effort is analogous to the difference between for example multiplying out using conventional arithmetic the polynomial;

$$(x-2)(x+3)(x+1) \ldots (x-17)$$

and simply evaluating $$(9-2)(9+3)(9+1) \ldots (9-17)$$

where all the numbers in this example are arbitrary for the sake of argument)

Case 2, k=m

In this case $M_b(x) = B_m x^m + \ldots + B_O$ cannot be represented as an m-tuple and hence there is no element of GF($2^m$) whose type (3) representation has digits in one-to-one correspondence with $B_m \ldots B_O$. However $M_b(x)$ modulo $M_a(x)$ does have such a representation, and this latter is just $M_b(a)$ as before. Knowing $M_b(x)$ modulo $M_a(x)$ and knowing the degree of $M_b(x)$ to be m enables us to write down $M_b(x)$, which is just (in this case) $M_a(x)$ plus ($M_b(x)$ modulo $M_a(x)$). This is more easily evaluated by adding (modulo 2) $M_b(a)$ to $M_a(a)$.

Examples are now given;

Example 1. k<m

Find the minimum polynomial of $b = a^5$ in GF($2^4$).

Solution: The distinct roots of $M_b(x)$ are $a^5$ and $a^{10}$, since $a^{20} = a^5$.

Thus $M_b(x) = (x+a^5)(x+a^{10})$ so $M_b(a) = (a+a^5)(a+a^{10}) = a^2 \cdot a^8 = a^{10} = 0111$ thus $M_b(x) = x^2 + x + 1$.

Example 2. k=m

Find the minimum polynomial of $a^3$.

Solution: The distinct roots are $a^3, a^6, a^{12}$ and $a^{24} = a^9$, since $a^{18} = a^3 \cdot$ so $M_b(a) = (a+a^3)(a+a^6)(a+a^{12})(a+a^9) = a^9 \cdot a^{11} \cdot a^{13} \cdot a^3 = a^6 = 1100$ and as k=m we must add $M_a(a) = a^3 + a + 1$, i.e. 10011. Thus 1100 plus 10011 (mod 2) is 11111 and so $M_b(x)$ is $x^4 + x^3 + x^2 + x + 1$.

The above method for k=m of finding a minimum polynomial is employed in the embodiments of the invention which are described below.

It has been shown that if a primitive element in GF($2^m$), i.e. "w" is a root of the primitive polynomial $P_w(x)$, a degree m polynomial, then the element $$T = (b+w)(b^2+w)(b^4+w)(b^8+w) \ldots (b^{2m-1}+w)$$

has the property that if T and $P_w$ are written as m-tuple and (m+1)-tuple respectively, then $T+P_w$ is the (m+1)-tuple corresponding to the minimum polynomial of "b."

The process of adding w to any element is carried out by complementing its penultimate bit (second last from the right), when the element is written in m-tuple form. The following algorithm thus generates the required polynomial.

Put T=000000...000001 and B=b do the following two steps m times:
1. replace T by T times B with the penultimate bit complemented.
2. replace B by its square finally add T to $P_w$.

Figure 2:
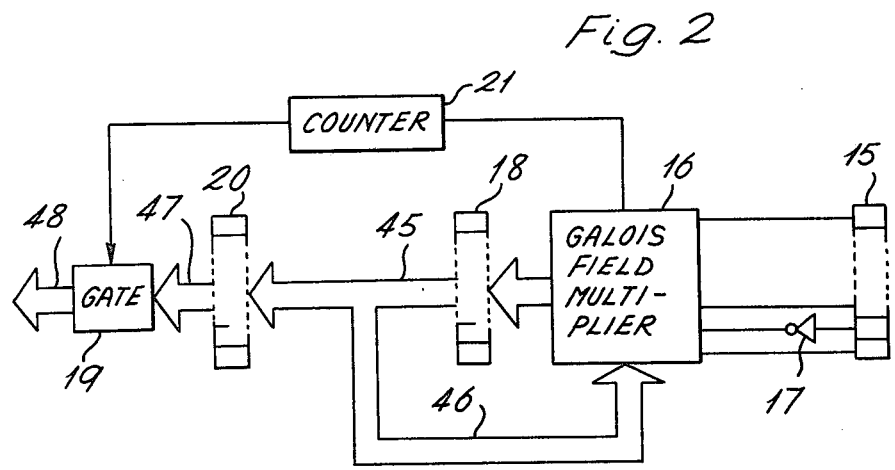
FIG. 2 is block diagram of apparatus for generating coefficients.

The apparatus of FIG. 2 carries out this algorithm. A register 15 is connected as described in Chapter two of the above mentioned book by Berlekamp as a Galois-field squaring circuit and, in operation contains first "b" the "$b^2$" and so on. The register 15 is parallel connected to a Galois-field multiplier 16 also as described in Chapter two of Berlekamp's book. The connection for the penultimate bit includes an inverter 17 which has the effect of changing each output b, $b^2$ etc. from the register 15 to b+w, $b^2$+w etc. If the 4-tuple w is for example 0010, the modulo two addition of w to any other 4-tuple is carried out by inverting the penultimate bit. This example provides a simple illustration of the types of operation involved but it is not an example applicable to encryption since $2^4-1$ is not prime.

The multiplier 16 is connected to a register 18, which is the register which holds T of the algorithm and the output of the register 18 is connected back to the multiplier 16 and to a complementing circuit 20. Gating means 19 at the output of the complementing circuit 20 is controlled by a counter 21 which has an input from the multiplier 16 to allow the number of multiplications carried out to be counted. In FIG. 2 broad connections 45 to 48 indicate channels formed by several conductors so that the various bits making up the m-tuples can be transferred in parallel. Similarly the gating means 19 is a group of gates for gating the bits in parallel. The register 18 and the complementing circuit 20 may be made up of type SN 74174 and SN 7404, integrated circuits respectively, each of which contains six sections, each bit requiring one section.

In the first cycle of operation the term b+w is applied to a first input of the multiplier 16 and then passes by way of the register 18 back to a second multiplier input. The first multiplier input now receives $b^2$+w and so the product (b+w)($b^2$+w) is formed at the multiplier output and passed back to the second multiplier input. At each stage the complementing circuit 20 complements all those bits which correspond to $P_w$, so in effect adding $P_w$. However when the counter 21 signals that the multiplication process has been carried out m times the current contents are gated from the circuit 20 and the required coefficients are available for use in setting shift register taps. $P_w$ is of course an m+1-tuple and therefore so is $T+P_w$, m of these m+1 digits represents the presence or absence of feedback taps and the remaining digit which can be either the left or right hand digit in $T+P_w$ represents the input to the register. The register contents may be shifted in one direction or the other.

If the coefficients of minimum polynomials are required for cases where k<m the complementing circuit 20 is omitted.

The key to a code may be an arbitrary element in $GF(2^m)$ where $2^m-1$ is prime except 0 or 1, and the apparatus of FIG. 2, given this arbitrary element (say b, which will be represented as an m-tuple), finds a polynomial $M_b$ which is the minimum polynomial of b, and is a (m+1)-tuple. The coefficients of the minimum polynomial can then be used to set the taps, either manually or automatically, in a shift register supplying a sequence for encyphering or decyphering.

As a point of information, in a field $GF(2^m)$ where $2^m-1$ is prime, there are $(2^m-2)/m$ primitive polynomials and each will generate a different maximum-length sequence, or cypher. For any given primitive polynomial, there are m elements of $GF(2^m)$ for which this is the minimum polynomial, and this it is possible that two arbitrary m-tuples may generate the same cypher, but this is normally inconsequential and in any case extremely unlikely for large m. The important thing is that an arbitrary m-tuple has only a 1 in $(2^m-2)/m$ chance of being the key to an unknown cypher.

Figure 3:
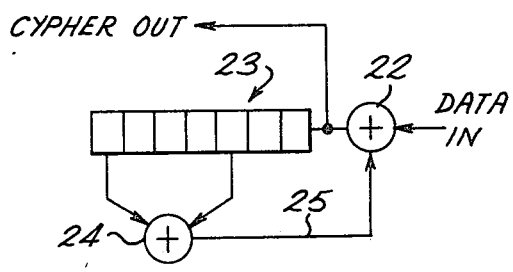
FIG. 3 is a block diagram of encyphering apparatus.
Figure 4:
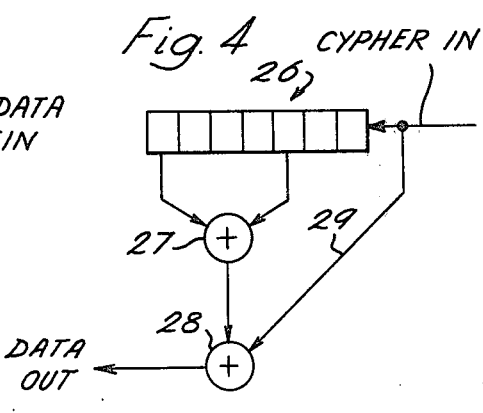
FIG. 4 is a block diagram of decyphering apparatus.

As has been mentioned the sequence from a shift register with appropriate tap connections can simply be added to the data to be encyphered and subtracted for decyphering but another scheme is shown in FIGS. 3 and 4 where data for encryption is passed to a first input of a modulo-two gate 22 with output coupled to a shift register 23. Tap connections between a modulo-two gate 24 and the register 23 are selected according to an m-tuple from the apparatus of FIG. 2 but the output 25 from the gate 24 which corresponds to the least significant digit of the corresponding (m+1)-tuple is connected to a second input of the gate 22. Encyphered data is taken at the output of the gate 22.

In operation a key may include a part which consists of the m-tuple b for entry into the apparatus of FIG. 2 to allow tap connections to be set up.

The apparatus of FIG. 4 is used for decyphering and the same key is supplied. Encyphered data is applied to a register 26 with tap connections selected from the key by the apparatus of FIG. 2. The two most significant taps are connected as inputs to a modulo-two gate 27 and a modulo-two gate 28 receives inputs from the gate 27 and the least significant tap 29 of the register 26. Decyphered data is received at the output of the gate 28.

In practice there would of course be many more shift register stages than are shown in FIGS. 3 and 4, thirty one or more being a suitable number. Note that the number of stages must be prime in order to conform with the restriction that $2^{m-1}$ is prime. If $2^{m-1}$ is prime then m must also be prime but the converse is not true.

Figure 5:
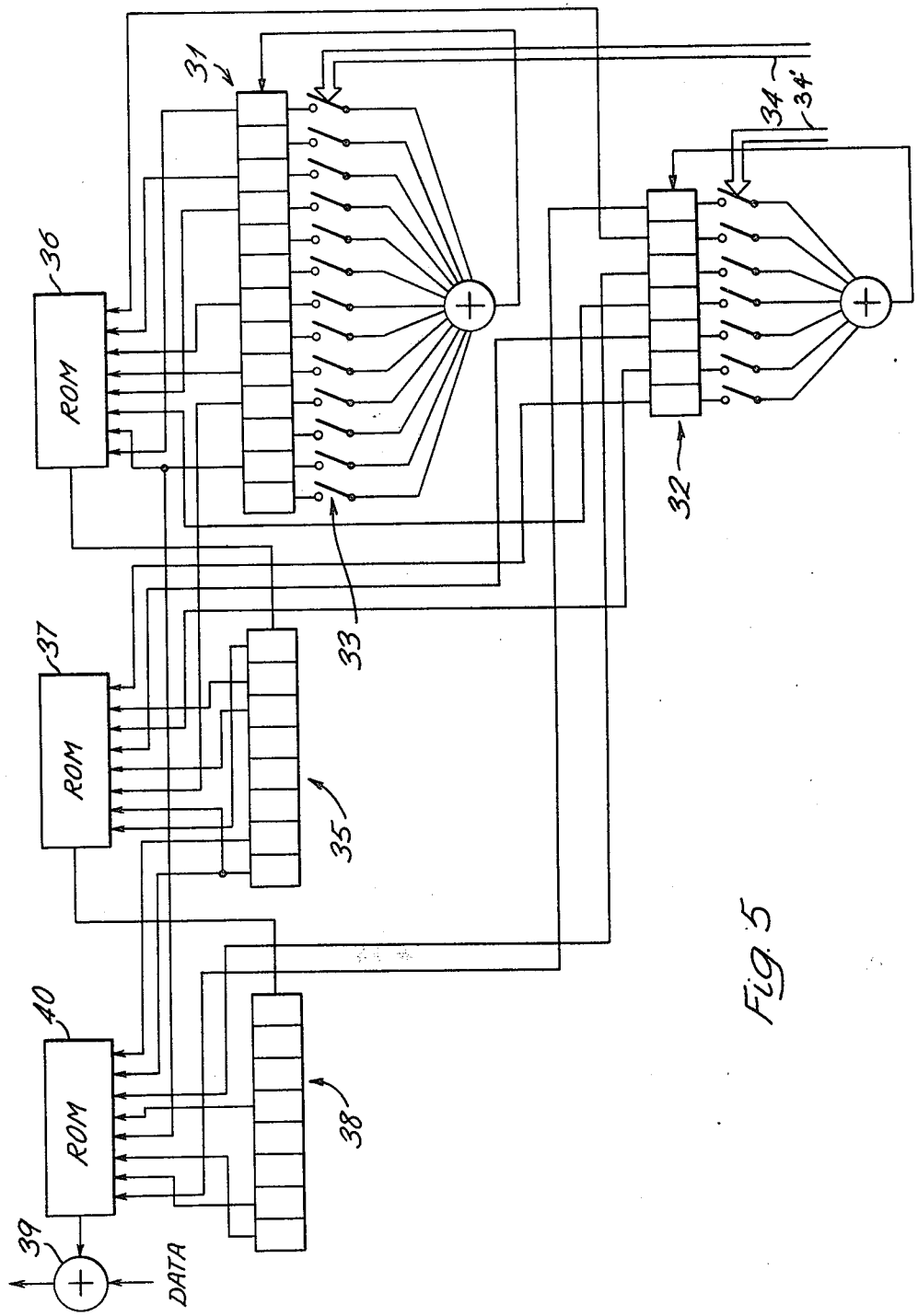
FIG. 5 is a block diagram of another encyphering/decyphering apparatus.

A further apparatus for encyphering is shown in FIG. 5 where the outputs from two circuits each of the type shown in FIG. 2 are used to select tap connections for shift registers 31 and 32 by way of channels 34 and 34'. Each switch, such as the switch 33, in a tap connection may, for example, be a transistor circuit, forming part of an integrated circuit which also includes the shift registers 31 and 32. Thus potentials are simply applied from the appropriate stages of the circuits 20 by way of the gates 19 of the circuits similar to FIG. 2 to transistor circuits of the shift registers 31 and 32, in order to connect corresponding taps, and opposite potentials are applied to disconnect taps. Channels 34 and 34' encompass one connection from each stage of one of the circuits 20 to the tap connection of each corresponding stage of the shift registers 31 and 32 respectively. Each circuit 20 may have a different key portion.

A further shift register 35 receives its input sequence from a read-only memory (ROM) 36. Multi-bit input signals from a combination of various stages of the shift registers 31 and 32 as indicated for example by the connections in FIG. 5 are used to address each single output bit of the ROM 36. Thus at each interval between shifts the ROM 36 is addressed and applies a bit to the input stage of the shift register 35, this bit being determined according to the internal look-up table or program of the ROM 36.

A further ROM 37 is addressed from the shift registers 31, 32 and 35 by way of the arbitrary connections shown and provides an input sequence for another shift register 38. The final sequence for a modulo-two adder 39 is supplied by a ROM 40 which is addressed again by way of the arbitrary connections shown from the shift registers 32, 33, 35 and 38.

The period of the final sequence generated will be the LCM of the periods of the sequences generated by registers 31 and 32. These periods will themselves in the particular example given where the register 31 has thirteen stages and the register 32 has seven stages be $2^{13}-1$ and $2^7-1$, respectively. These numbers are of course both prime since it has been stipulated that $2^m-1$ shall be prime. It therefore follows that the LCM is the product $2^{13}-1$ times $2^7-1$ which is therefore the period of the final sequence.

The purpose of the ROMs is to make the sequence generated less structured than when modulo 2 feedback only is employed. Each ROM is therefore programmed in a manner which as far as possible has no simply analysable structure.

Data for encryption is also applied to the adder 39 so that encyphered data is generated at the output of the adder 39. For decyphering, apparatus similar to that shown in FIG. 5 is used except the encyphered data is applied at one of the inputs of the adder circuit 39 and decyphered data is available at the output. The other input of the circuit 39 is supplied from the ROM 40 with the taps of the shift registers 32 and 33 set up as for encyphering the same data and with all shift registers 32, 33, 35 and 38 having the same initial sequence.

In apparatus of the type shown in FIG. 5 the arbitrary connections between the ROMs and the shift registers may be varied in different constructions, or either manually or automatically and/or altered automatically from time to time. Similarly ROM programmes can, of course, be changed and some specific details of these items and part of the initial conditions may form part of the key. Note however that no feedback connections are allowed, for example a connection from the shift register 35 to the shift register 31 or 32 is not permissible since otherwise minor sequences may be generated in the loop set up in this way giving an unpredictable output sequence for the adder circuit 39. The ROMs of FIG. 5 may be type SN 74287.

The various shift registers and modulo-two gates mentioned in the specific embodiments may be types SN 74164 and SN 7486, respectively.

The control lines and clock-pulse generators required for transfer of data between the circuits of the various figures are conventional and therefore, to avoid unnecessarily lengthening the description, are not described.

Although several specific embodiments of the invention have been described it will be clear that the invention may be put into practice in many other ways. For example different ways of encyphering and decyphering using a maximal length sequence will be apparent and as will different ways of constructing encyphering and decyphering circuits based on FIGS. 3, 4 and 5.

I claim:

1. Encyphering or decyphering apparatus comprising a shift register having m stages where m is a positive integer and $2^m-1$ is prime, each stage having an associated respective tap connection where an output signal representative of the conduction state of that stage is, in operation, available, first logic means, having a plurality of input terminals, for combining input signals applied to the terminals according to a first predetermined logical process, selection means for automatically selecting tap connections and coupling the selected connections to respective inputs of the first logic means, the tap connections being so selected in accordance with the coefficients of minimum polynomials in a Galois-field $GF(2^m)$ that the position of the stage associated with each selected tap connection in the shift register corresponds to the position of a predetermined value of coefficient in one of the said polynomials, and second logic means for combining digital signals which are to be encyphered or decyphered with other digital signals according to a second predetermined logical process, which may be the same as the first logical process, the said other digital signals being related to the output signals of the first logic means.

the selection means in operation finding the said coefficients, starting from any arbitrary element b in the said field which satisfies k=m where k is the least integer with the property $b^{2^k}=b$, and the selection means comprising squaring means for providing first digital signals representing a first sequence of m-tuples, the first m-tuple in the first sequence representing the element b in $GF(2^m)$ except 0 or 1 and each successive m-tuple in the first sequence representing the square of the element represented by the preceding m-tuple up to the power $2^{m-1}$, means for deriving second digital signals from the first digital signals, the second digital signals representing a second sequence of m-tuples in which each m-tuple equals the modulo-two addition of one m-tuple of the first sequence and a further m-tuple representing the coefficients of a primitive element in $GF(2^m)$ which is a root of a primitive polynomial of degree m, means for deriving a third digital signal from the second digital signals, the third digital signal representing the Galois-field product of all the m-tuples of the second sequence multiplied together, and means for deriving a fourth digital signal from the third digital signal, the fourth digital signal representing the modulo-two sum of m-tuples representing the said product and the said primitive polynomial as represented by its coefficients.

2. Apparatus according to claim 1 wherein the means for deriving the second digital signals operates to add coefficients which are all zero except that of degree one, by complementing that digit of each m-tuple of the first sequence which corresponds to degree one.

3. Apparatus according to claim 1, wherein the means for deriving the third digital signals includes a Galois-field multiplier circuit, and an m-bit register, and a counter, the register being connected to receive the product from the multiplier circuit and to apply each product to one input of the multiplier circuit, the other multiplier-circuit input being connected to receive the second digital signals, and the apparatus being so constructed that m multiplication operations are carried out in order to derive the third signal.

4. Apparatus according to claim 1 wherein the means for deriving the fourth digital signal include means for complementing each digit of the third digital signal which corresponds in degree with those coefficients of primitive polynomial which are "one."

5. Apparatus according to claim 1 wherein $2^m-1$ is prime.

6. Encyphering apparatus according to claim 1 wherein the first logic means is a modulo-two gate the output of which is conncted as one input of a further modulo-two gate with output connected to the input stage of the shift register, the second modulo-two gate forming the second logic means, so that the said other digital signals are the output signals of the first logic means, and means are provided for applying data for encryption to the other input of the further gate, encyphered data appearing, in operation, at the output of the further gate.

7. Decyphering apparatus according to claim 1 wherein the first logic means is a modulo-two gate with an output connected as one input to a further modulo-two gate forming the second logic means, so that the said other digital signals are the output of the first logic means, and means are provided for applying data to be decyphered to both the input stage of the shift register and the other input of the further gate, decyphered data appearing, in operation, at the output of the further gate.

8. Apparatus according to claim 1 wherein
the first logic means is a modulo-two gate, the output of which is coupled to the input stage of the shift register.

9. Apparatus according to claim 8 wherein the second logic means is coupled to receive input signals from chosen stages of the shift register at predetermined times, and thus receives selected digital output signals from the modulo-two gate.

10. Apparatus according to claim 9, wherein the second logic means comprises:
a read-only memory having address terminals connected to the chosen stages of the shift register, and
means for deriving encyphered or decyphered data from signals which, in operation appear at the output of the read-only memory.

11. Apparatus according to claim 10 including at least one further shift register and at least one further read-only memory wherein the output of each read-only memory is connected to the input stage of one of the further shift registers particular thereto to form a sequence of alternating shift registers and read-only memories, the address terminals of the read-only memories are connected to selected stages of the shift registers except that no address terminal of a read-only memory is connected to a stage of a shift register further along the sequence in the direction of signal propagation than the output of that read-only memory, and wherein the last read-only memory along the sequence in the said direction is coupled to means for combining the output signals thereof with data to be encyphered or decyphered.

12. Apparatus according to claim 11 including at least one additional shift register having m' stages where $2^{m'}-1$ is prime and no additional shift register has m stages or the same number of stages as any other additional shift register, at least one additional selection means (one for and particular to each additional shift register) for so selecting tap connections in accordance with the coefficients of minimum polynomials in a Galois-field $GF(2^{m'})$ that the position of the stage associated with each selected tap connection in the shift register corresponds to the position of a predetermined value of coefficient in one of the said polynomials,
at least one tap connection switching means (one for and particular to each additional shift register) in operation controlled by signals from a respective one of the additional selection means, and
at least one additional modulo-two gate (one for and particular to each additional shift register), the output of each additional modulo-two gate being connected to the input stage of the additional shift register particular to that modulo-two gate, and having inputs connected to taps of that shift register selected by the tap connection switching means particular thereto,
chosen input of at least one of the read-only memories being connected to chosen stages of the additional shift register, or at least one of the additional shift registers.

13. Apparatus according to claim 10 including at least one additional shift register having m' stages where $2^{m'}-1$ is prime, no additional shift register having m stages or the same number of stages as any other additional shift register, at least one additional selection means (one for and particular to each additional shift register) for so selecting tap connections in accordance with the coefficients of minimum polynomials in a Galois-field $GF(2^{m'})$ that the position of the stage associated with each selected tap connection in the shift register corresponds to the position of a predetermined value of coefficient in one of the said polynomials, at least one tap connection switching means (one for and particular to each additional shift register) in operation controlled by signals from a respective one of the additional selection means, and
at least one additional modulo-two gate (one for and particular to each additional shift register), the output of each additional modulo-two gate being connected to the input stage of the additional shift register particular to that modulo-two gate, and having inputs connected to taps of that shift register selected by the tap connection switching means particular thereto,
chosen inputs of the read-only memory being connected to chosen stages of the additional shift register, or each additional shift register.

14. Encyphering of decyphering apparatus comprising:
a shift register having m stages where m is a positive integer and $2^m-1$ is prime, each stage having an associated respective tap connection where an output signal representative of the conduction state of that stage is, in operation, available,
first logic means, having a plurality of input terminals, for combining input signals applied to the terminals according to a first predetermined logical process, selection means for automatically selecting tap connections and coupling the selected connections to respective inputs of the first logic means, the tap connections being so selected in accordance with the coefficients of a minimum polynomials in a Galois-field $GF(2^m)$ that the position of the stage associated with each selected tap connection in the shift register corresponds to the position of a predetermined value of coefficient in one of the said polynomials, and second logic means for combining digital signals which are to be encyphered or decyphered with other digital signals according to a second predetermined logical process, which may be the same as the first logical process, the said other digital signals being related to the output signals of the first logic means, the selection means in operation finding the said coefficients, starting from any arbitrary element b in the said field which satisfies k=m where k is the least integer with the property $b^{2k}=b$, and the selection means being constructed to form the Galois-field product $$T=(b+w)(b^2+w)(b^4+w)(b^8+w) \ldots (b^{2m-1}+w)$$

where b is any arbitrary element in $GF(2^m)$ except 0 or 1, and w is a root of a primitive polynomial of degree m, and to form the modulo-two sum of T as represented by the coefficients thereof, and the said primitive polynomial as represented by its coefficients.

* * * * *